(12) United States Patent
Goyal et al.

(10) Patent No.: US 12,400,289 B2
(45) Date of Patent: Aug. 26, 2025

(54) OBJECT STITCHING IMAGE GENERATION

(71) Applicant: INTERNATIONAL BUSINESS MACHINES CORPORATION, Armonk, NY (US)

(72) Inventors: Prateek Goyal, Indore (IN); Seema Nagar, Bangalore (IN); Manish Anand Bhide, Hyderabad (IN); Kuntal Dey, Rampurhat (IN)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 17/245,191

(22) Filed: Apr. 30, 2021

(65) Prior Publication Data
US 2022/0351331 A1 Nov. 3, 2022

(51) Int. Cl.
G06T 3/4038 (2024.01)
G06F 18/2132 (2023.01)
G06F 18/214 (2023.01)
G06N 3/08 (2023.01)
G06N 5/02 (2023.01)

(52) U.S. Cl.
CPC ........ *G06T 3/4038* (2013.01); *G06F 18/2132* (2023.01); *G06F 18/214* (2023.01); *G06N 3/08* (2013.01); *G06N 5/02* (2013.01)

(58) Field of Classification Search
CPC . G06T 3/4038; G06F 18/2132; G06F 18/214; G06N 3/08; G06N 5/02; G06N 3/042; G06N 3/0475; G06N 3/088; G06N 3/0464; G06V 10/82; G06V 10/16
See application file for complete search history.

(56) References Cited

U.S. PATENT DOCUMENTS

| 8,416,302 | B2 | 4/2013 | Zhang et al. |
| 9,128,909 | B2 | 9/2015 | Brindley |
| 10,074,200 | B1 * | 9/2018 | Yeturu ................. G06F 40/169 |
| 10,713,821 | B1 * | 7/2020 | Surya .................... G06N 3/045 |
| 11,640,708 | B1 * | 5/2023 | Blechschmidt ........ G06V 20/10 382/103 |
| 11,720,942 | B1 * | 8/2023 | Bazzani ............. G06Q 30/0613 705/26.41 |
| 12,195,040 | B1 * | 1/2025 | Pronovost ............. G06N 3/047 |

(Continued)

FOREIGN PATENT DOCUMENTS

| CN | 110689086 A | 1/2020 |
| EP | 2731081 A1 | 5/2014 |

OTHER PUBLICATIONS

Mell et al., "The NIST Definition of Cloud Computing", NIST, Special Publication 800-145, Sep. 2011, 7 pages.

(Continued)

*Primary Examiner* — Solomon G Bezuayehu
(74) *Attorney, Agent, or Firm* — Gavin Giraud; Andrew D. Wright; Calderon Safran & Wright P.C.

(57) ABSTRACT

A method includes receiving, by a computing device, concepts of a domain; determining, by the computing device, objects relevant to the concepts; generating, by the computing device, a new image by stitching the relevant objects together; determining, by the computing device, whether the new image is accurate or inaccurate; and in response to determining the new image is inaccurate, propagating, by the computing device, the inaccurate new image back to a convolutional neural network (CNN).

20 Claims, 7 Drawing Sheets

(56) References Cited

U.S. PATENT DOCUMENTS

| | | | |
|---|---|---|---|
| 12,198,430 B1* | 1/2025 | Kottur | G06V 20/35 |
| 2007/0035562 A1 | 2/2007 | Azuma et al. | |
| 2007/0146360 A1* | 6/2007 | Clatworthy | G06T 15/20 |
| | | | 345/419 |
| 2008/0266408 A1* | 10/2008 | Kim | H04N 23/698 |
| | | | 348/E5.024 |
| 2011/0255741 A1* | 10/2011 | Jung | G06V 20/58 |
| | | | 382/103 |
| 2013/0077892 A1* | 3/2013 | Ikeno | G06T 3/4038 |
| | | | 382/286 |
| 2014/0377702 A1* | 12/2014 | Nakahara | G03G 5/144 |
| | | | 430/131 |
| 2018/0060701 A1* | 3/2018 | Krishnamurthy | G06N 3/045 |
| 2018/0244199 A1* | 8/2018 | Gyori | G06T 3/4038 |
| 2018/0262683 A1* | 9/2018 | Meler | G06T 7/13 |
| 2019/0037138 A1* | 1/2019 | Choe | H04N 23/698 |
| 2020/0051249 A1 | 2/2020 | Walters et al. | |
| 2020/0074239 A1* | 3/2020 | Park | G06F 18/217 |
| 2020/0097569 A1* | 3/2020 | Sewak | G06F 16/345 |
| 2020/0201165 A1* | 6/2020 | Lock | H04N 23/698 |
| 2020/0387806 A1* | 12/2020 | Kaseda | G06F 40/35 |
| 2020/0401835 A1* | 12/2020 | Zhao | G06V 10/426 |
| 2021/0174565 A1* | 6/2021 | Awasthi | G06F 18/23 |
| 2022/0014554 A1* | 1/2022 | Vasu | H04L 63/20 |
| 2022/0068296 A1* | 3/2022 | Wilson | G06T 13/205 |
| 2022/0180491 A1* | 6/2022 | Shinohara | G03B 37/00 |
| 2022/0237830 A1* | 7/2022 | Khodadadeh | G06N 3/045 |

OTHER PUBLICATIONS

Frid-Adar et al., "GAN-based Synthetic Medical Image Augmentation for increased CNN Performance in Liver Lesion Classification", arXiv:1803.01229v1 [cs.CV], Mar. 3, 2018, 10 pages.

Bloice et al., "Augmentor: An Image Augmentation Library for Machine Learning", arXiv:1708.04680v1, Aug. 11, 2017, 5 pages.

Wong et al., "Understanding data augmentation for classification: when to warp?", arXiv:1609.08764v2 [cs.CV], Nov. 26, 2016, 6 pages.

Liu et al., "Generative Adversarial Networks for Image and Video Synthesis: Algorithms and Applications", arXiv:2008.02793v2 [cs.CV], Nov. 30, 2020, 22 pages.

Khan, "StyleGAN: Use machine learning to generate and customize realistic images", https://heartbeat.fritz.ai/stylegans-use-machine-learning-to-generate-and-customize-realistic-images-c943388dc672, Jul. 31, 2019, 19 pages.

Song et al., "Dynamic image stitching for moving object", Conference Paper; https://www.researchgate.net/publication/314194530, Dec. 2016, 7 pages.

Wu et al., "GP-GAN: Towards Realistic High-Resolution Image Blending", arXiv:1703.07195v3 [cs.CV], Aug. 5, 2019, 11 pages.

Xu et al., "Scene Graph Generation by Iterative Message Passing", arXiv:1701.02426v2 [cs.CV], Apr. 12, 2017, 10 pages.

Levin et al., "Seamless Image Stitching in the Gradient Domain", School of Computer Science and Engineering, downloaded Apr. 29, 2021, 12 pages.

* cited by examiner

OBJECT STITCHING IMAGE GENERATION

BACKGROUND

Aspects of the present invention relate generally to image generation and, more particularly, to object stitching image generation.

Existing systems for generating new images include transforming existing images, e.g., by rotations. Accordingly, existing systems generate images by modifying existing images.

SUMMARY

In a first aspect of the invention, there is a computer-implemented method including: receiving, by a computing device, concepts of a domain; determining, by the computing device, objects relevant to the concepts; generating, by the computing device, a new image by stitching the relevant objects together; determining, by the computing device, whether the new image is accurate or inaccurate; and in response to determining the new image is inaccurate, propagating, by the computing device, the inaccurate new image back to a convolutional neural network (CNN).

In another aspect of the invention, there is a computer program product including one or more computer readable storage media having program instructions collectively stored on the one or more computer readable storage media. The program instructions are executable to: receive concepts of a domain; determine objects relevant to the concepts; generate a new image by stitching the relevant objects together; determine whether the new image is accurate or inaccurate; and in response to determining the new image is accurate, label the new image as an accurate new image.

In another aspect of the invention, there is system including a processor, a computer readable memory, one or more computer readable storage media, and program instructions collectively stored on the one or more computer readable storage media. The program instructions are executable to: receive concepts of a domain; determine objects relevant to the concepts; generate a new image by stitching the relevant objects together; apply scene graphs to the new image; and in response to determining the new image does not match the scene graphs, propagate the new image back to a convolutional neural network (CNN).

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
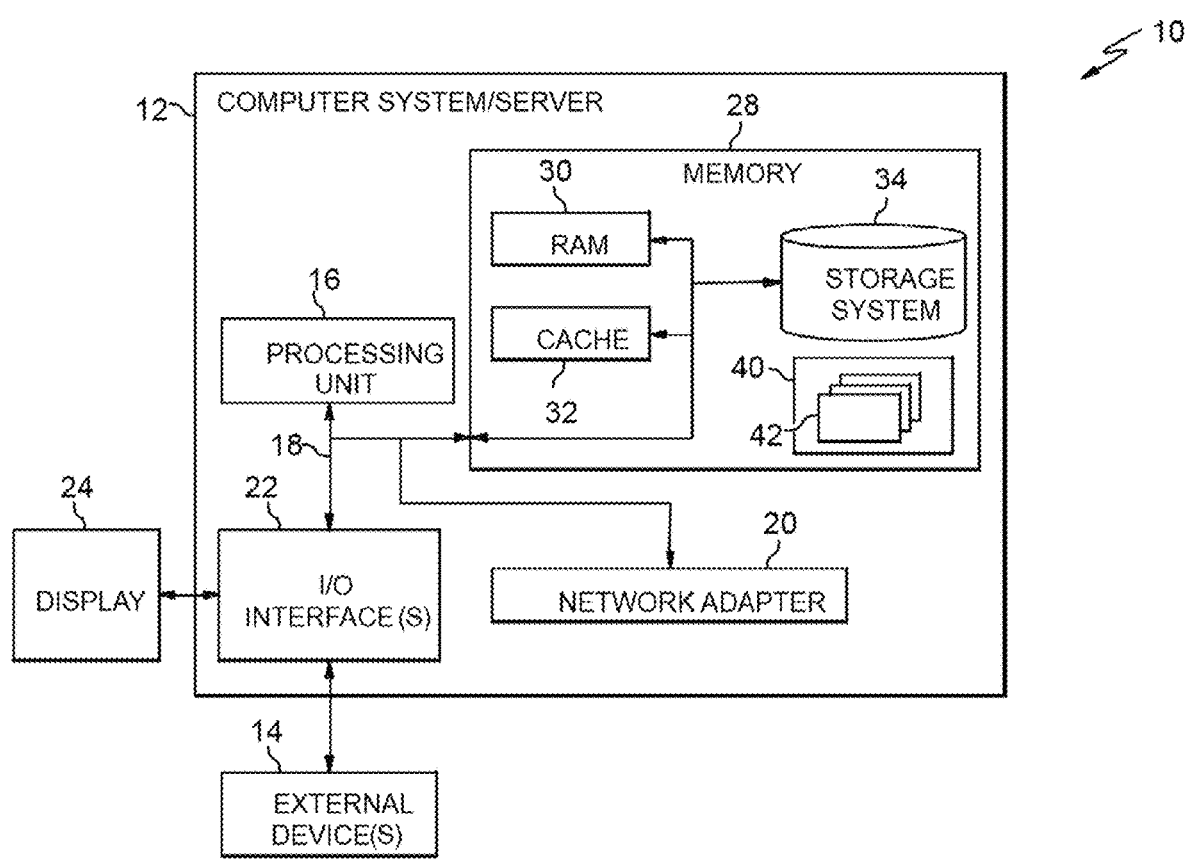
FIG. 1 depicts a cloud computing node according to an embodiment of the present invention.

Aspects of the present invention relate generally to image generation and, more particularly, to object stitching image generation. According to aspects of the invention, systems and methods allow for the generation of new images in a constrained setting, i.e., a domain. In embodiments, generating new images includes receiving a set of concepts relevant to the domain and determining objects relevant to the concepts. Image generation further includes stitching the objects together in a semantically meaningful manner to generate the new images. In this manner, implementations of the invention allow generate accurate new images. In further embodiments, implementations of the invention enrich existing images by generating new images which not only have many of the objects found in an existing image, but also additional objects relevant to the concepts shown in the existing image and which are missing from the existing image. In this way, the new image enriches an existing image by including relevant objects missing from the existing image. In embodiments, artificial intelligence systems use the accurate new images for training. In this way, aspects of the invention address difficulties of obtaining image data for training of artificial intelligence systems.

A generative adversarial network (GAN) includes architecture for the generation of new images. However, in some applications, new images from a GAN look like already existing images. Further, these new images are sometimes missing objects since a GAN is unable to guarantee that all objects present in an existing image are also present in a new image. Additionally, a GAN does not include control parameters, such as determining which objects to not include in the new image and which objects to include. In this way, a GAN is unable to address the following exemplary scenarios: 1) building a machine learning model for action identification and action prediction, e.g., throwing a ball or swimming in a pool; 2) generating new images by stitching objects together in a semantically meaningful manner; 3) only having a few images for a particular constrained setting, i.e., domain. In this way, a GAN is unable to generate accurate new images.

Implementations of the invention provide improvements to computer technologies by improving image generation. In embodiments, aspects of the invention augment GAN architecture by adding a convolutional neural network (CNN) at an input of the GAN for the generation of new images. In generating the new images, aspects of the invention receive a set of concepts which are relevant to a domain. From these concepts, aspects of the invention determine objects which are relevant to the concepts and therefore should be in the new image. In embodiments, the generation of new images includes stitching these objects together. Additionally, aspects of the invention train the CNN and GAN using generative adversarial techniques. For example, training includes a discriminator of the GAN learning how to distinguish between new images from the generator which are accurate new images and new images which are inaccurate new images. In response to this learning, the discriminator filters out new images which are inaccurate new images. In embodiments, aspects of the invention propagate the inaccurate new images back to the CNN for increasing domain knowledge. In this way, aspects of the invention improve computer technology by improving image generation accuracy.

Implementations of the invention also allow for the practical application of generating new images which enrich existing images. In embodiments, aspects of the invention receive a set of concepts, e.g., throwing a ball, etc., for a domain, e.g., baseball, etc. By receiving these concepts, aspects of the invention determine which objects are relevant to the concepts. In embodiments, aspects of the invention stitch these objects together to generate the new image. Accordingly, embodiments of the invention enrich existing images by including relevant objects from the domain that are missing in the existing images, in addition to including objects in the new image which are present in the existing image.

In addition, the steps for generating the new images are unconventional. In embodiments, prior to the generation of a new image, aspects of the invention: a) receive a set of concepts for a domain; b) determine objects relevant to the set of concepts for inclusion in the new image; c) train a GAN; d) generate a new image by stitching the relevant objects together; e) determine if the new image is accurate or inaccurate; and f) label the accurate new image as a "real image" or propagate the inaccurate new image back to the CNN of the image generation module. In view of this unconventional arrangement of steps, embodiments provide new images which are accurate.

It should be understood that, to the extent implementations of the invention collect, store, or employ personal information provided by, or obtained from, individuals (for example, image data from existing images), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
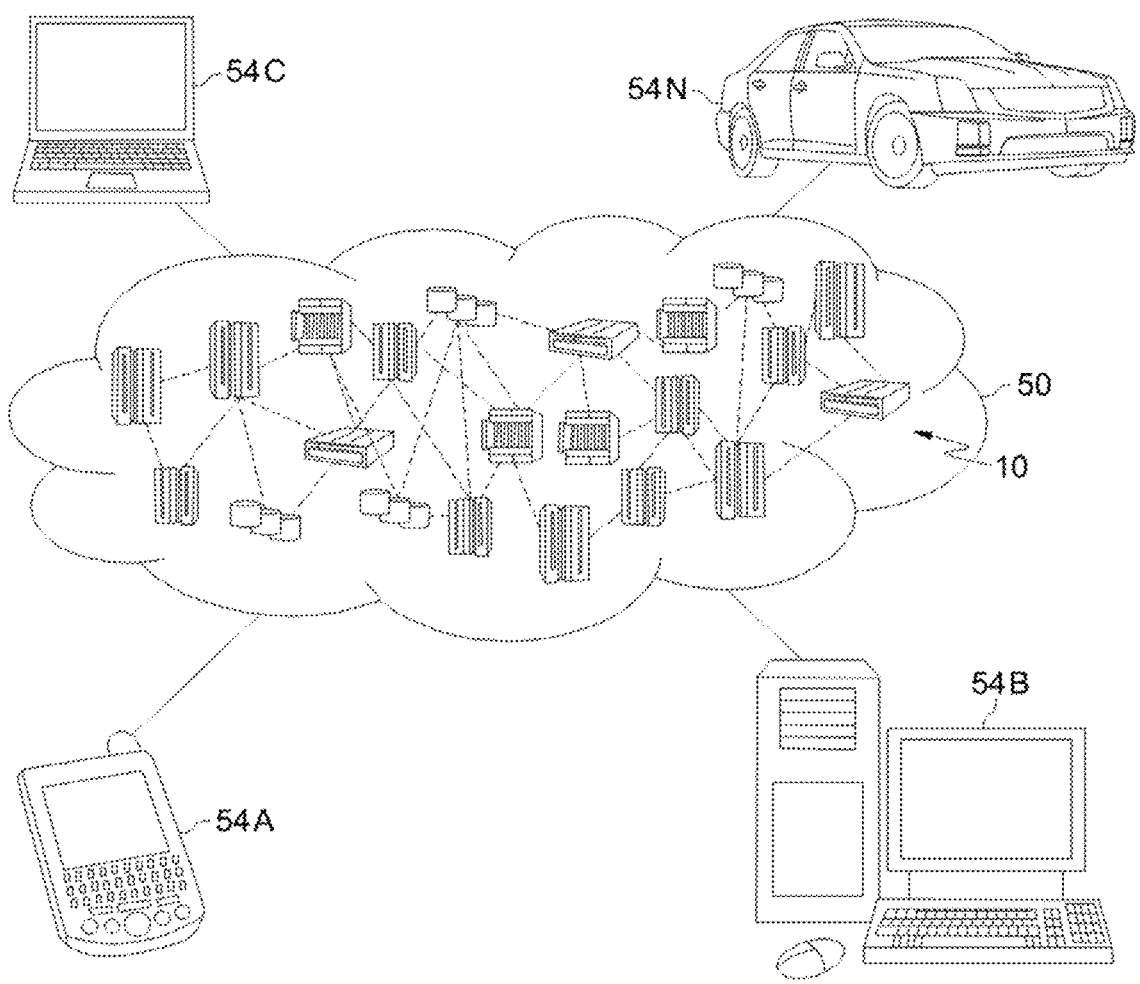
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
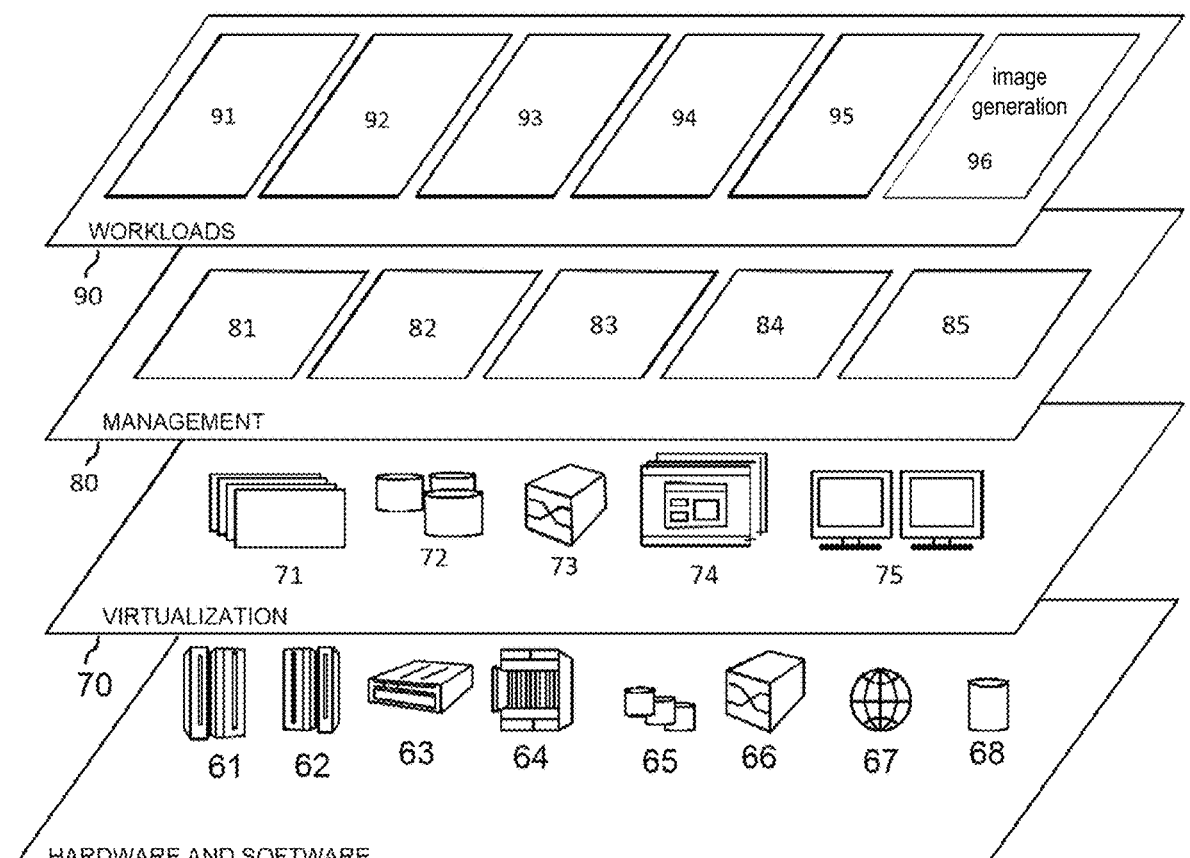
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image generation 96.

Implementations of the invention may include a computer system/server 12 of FIG. 1 in which one or more of the program modules 42 are configured to perform (or cause the computer system/server 12 to perform) one of more functions of the image generation 96 of FIG. 3. For example, the one or more of the program modules 42 may be configured to: a) receive a set of concepts for a domain; b) determine objects relevant to the set of concepts for inclusion in the new image; c) train a GAN; d) generate a new image by stitching the relevant objects together; e) determine if the new image is accurate or inaccurate; and f) label the accurate new image as a "real image" or propagate the inaccurate new image back to the CNN of the image generation module.

Figure 4:
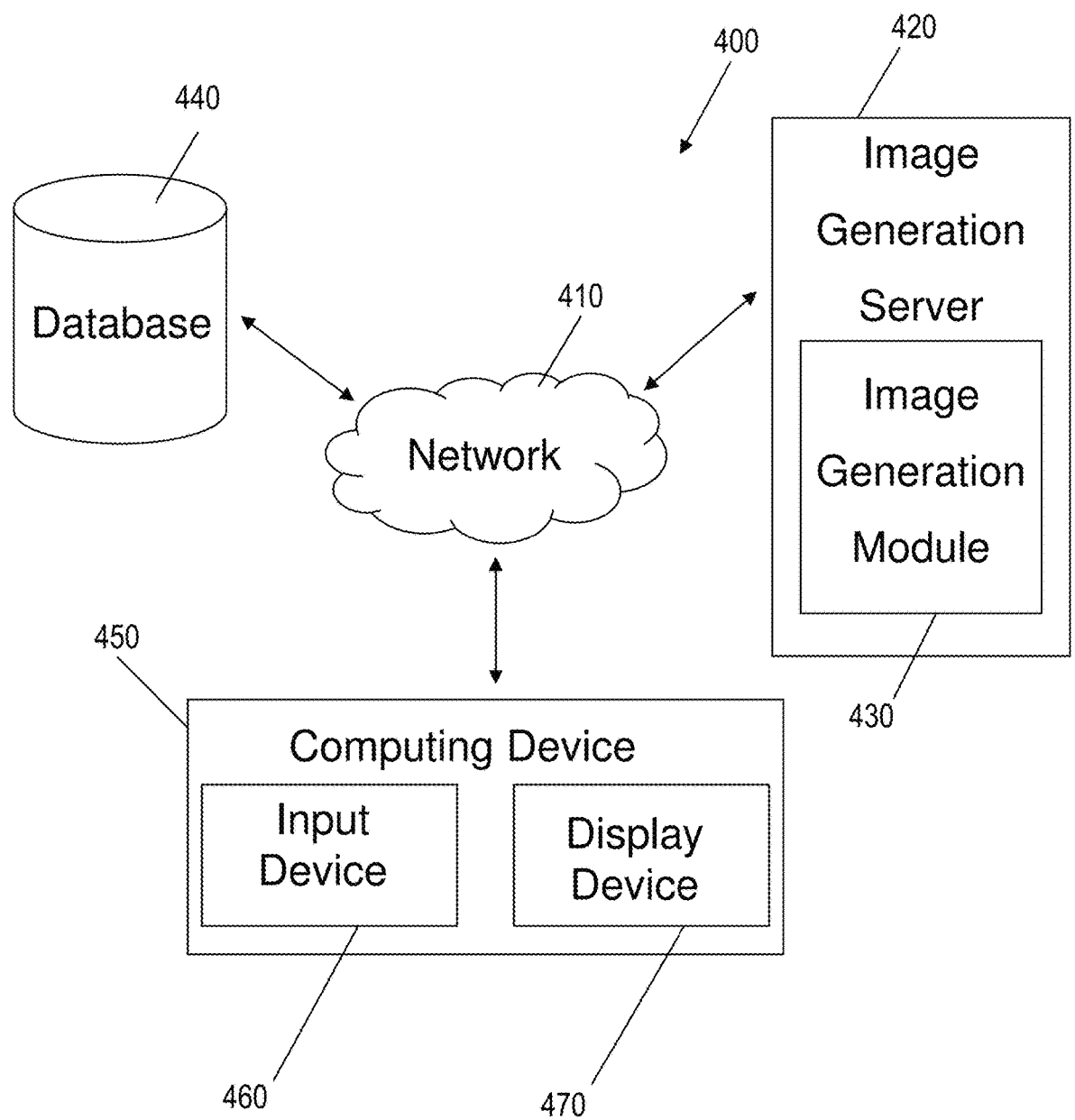
FIG. 4 shows a block diagram of an exemplary environment in accordance with aspects of the invention.

FIG. 4 shows a block diagram of an exemplary environment in accordance with aspects of the invention. In embodiments, the environment 400 includes a network 410, an image generation server 420, a database 440, and a computing device 450 that includes an input device 460 and a display device 470 for viewing images. In embodiments, the computing device 450 is a user device, e.g., a desktop computer, a laptop computer, a tablet, a smartphone, amongst other examples, comprising one or more components of computer system/server 12 of FIG. 1. The image generation server 420 is a computing device comprising one or more components of computer system/server 12 of FIG. 1. In embodiments, the image generation server 420 comprises an image generation module 430, which comprises one or more program modules such as program modules 42 described with respect to FIG. 1. The image generation server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

In embodiments, the image generation module 430 generates new images by stitching together relevant objects using deep learning. In embodiments, the deep learning of the image generation module 430 includes a convolutional neural network (CNN) and a generative adversarial network (GAN). In embodiments, the CNN is a plurality of neural nodes forming a neural network which includes a plurality of layers for determining which objects should be in a new image. In further embodiments, the GAN is a computing architecture which generates new images and filters out new images which are inaccurate.

Figure 5:
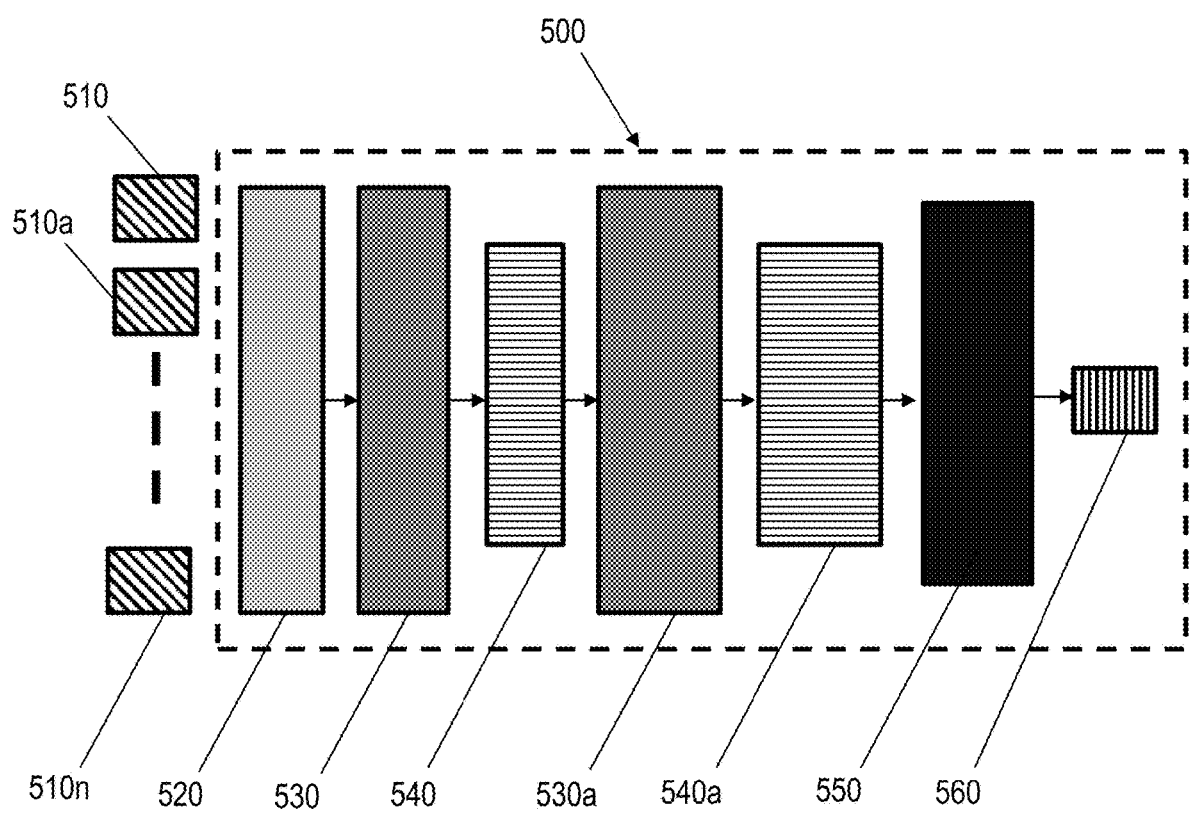
FIG. 5 shows a block diagram of an exemplary convolutional neural network (CNN) for object stitching in accordance with aspects of the invention.

FIG. 5 illustrates a CNN 500 in accordance with aspects of the invention. In embodiments, the image generation module 430 of FIG. 4 utilizes the CNN 500, which is described with reference to elements depicted in FIG. 4.

In embodiments, the CNN 500 receives concepts 510, 510a, 510n relevant to a domain from the network 410. In embodiments, a domain is a topic, amongst other examples. As an example, the sport of soccer is the domain. In another example, the domain is a nature setting, amongst other examples. In embodiments, a concept is an idea which is relevant to the domain. As an example, in response to the domain being soccer, the concepts are outdoors and a soccer game. In embodiments, objects are things relevant to the concepts 510, 510a, 510n. As an example, in response to the concepts of outdoors and a soccer game, the objects are a soccer ball, a soccer goal, soccer teams, soccer players, etc. As another example, in response to the domain being a nature setting, the concepts are animals and landscapes, and the objects are sparrows, eagles, rivers, and trees, etc. In embodiments, there is any number of domains, concepts (510 . . . 510n), and objects.

In embodiments, the CNN 500 receives the concepts 510, 510a, 510n as a list of concepts input by a user (e.g., a subject matter expert (SME)) through the input device 460 of the computing device 450. In further embodiments, the CNN 500 automatically receives the concepts 510, 510a, 510n by performing object detection using computer vision techniques in addition to or instead of a list of concepts input by an expert. As an example of object detection using computer vision, a user inputs at the input device 460 a set of accurate images illustrating concepts for a particular domain, and the objects relevant to the concepts. In this example, the computer vision techniques perform edge analysis on the objects for object detection. In another example, the user inputs an image having a single object and provides as an input a list of concepts and relevant objects into the input device 460.

In embodiments, the CNN 500 includes a concatenation layer 520 which receives the concepts 510, 510a, 510n and links the concepts 510, 510a, 510n together with objects relevant to the concepts 510, 510a, 510n. As an example, the concept 510 is a soccer game and the concept 510a is a soccer stadium. In this example, the CNN 500 receives as inputs a soccer game and a soccer stadium. In response to the inputs of a soccer game and a soccer stadium, neural nodes of the concatenation layer 520 link all objects relevant to these concepts 510, 510a, e.g., a soccer ball, a soccer field, soccer teams, soccer players, soccer fans, referees, a scoreboard, etc. In another example, the domain is a setting in nature, and the concept 510 is birds and the concept 510a is a water source. In this example, the neural nodes of the concatenation layer 520 links objects of all birds, e.g., sparrows, eagles, doves, fowls, etc., to the concept 510 and links objects of fish, rocks, sand, etc. to the concept 510a. In embodiments, the linking of the objects to the concepts 510, 510a results as an input image for a subsequent convolutional layer 530.

In embodiments, the objects are from various sources. As an example, the objects are from the database 440. In further embodiments, the objects are input as a list of objects by a user through the input device 460 of the computing device 450, in addition to or instead of the objects being from the database 440. In even further embodiments, the CNN 500 automatically receives the objects by performing object detection using computer vision techniques, in addition to or instead of the objects being within the database 440 and/or an input list of objects from an expert.

In embodiments, the neural nodes of the concatenation layer 520 determine which objects are relevant to the concepts 510, 510a, 510n by using domain knowledge from the database 440. In embodiments, the domain knowledge includes a knowledge graph, amongst other examples. In embodiments, a knowledge graph is an organization of concepts and objects and the relationships between them. In embodiments, the concepts and objects are vertices in the knowledge graph, while concepts and objects which are relevant to one another have lines connecting their vertices together, thereby forming the knowledge graph.

In embodiments, the knowledge graph is a semantic arrangement of concepts 510, 510a, 510n and objects because the relationships between the concepts 510, 510a, 510n and objects align with respect to their ontologies, i.e., meanings. For example, the concept 510 is a football and the vertex for concept 510 includes connections to other vertices representing the objects of a football, football teams, football players, football uniforms, football helmets, etc. However, another separate vertex represents the concept 510a, which represents the concept of football known as soccer. In this example, the vertex of concept 510 has connections to vertices of objects different from a football and a helmet, e.g., a soccer ball, a goalie, etc., in view of the meaning of concept 510a being soccer. In this way, the relationships between the concepts 510, 510a and objects align with respect to their ontologies. Accordingly, determining relevant objects in view of semantics and stitching these relevant objects together allows for the stitching of objects in a semantically meaningful manner.

In embodiments, the CNN 500 further includes a convolutional layer 530 which receives the input image from the concatenation layer 520 and filters out relatively less relevant objects from the input image by using a centrality value. In embodiments, neural nodes of the convolutional layer 530 apply a centrality value to the objects within the input image in view of the knowledge graph to determine a weight for each object. In further embodiments, the centrality value weighs objects higher for being closer to a vertex in the knowledge graph, while weighing objects lower for being farther from a vertex. As an example, for the concept 510 of a soccer game, the vertex for concept 510 has connections to objects of athletic shoes and objects of soccer cleats, amongst other connections. In this example, the objects of soccer cleats are closer to the soccer game vertex since soccer players typically wear soccer cleats. Accordingly, the objects of soccer cleats are given a higher weight than the objects of athletic shoes since the object of soccer cleats is closer to the vertex of concept 510.

In embodiments, the neural nodes of the convolutional layer 530 filter out the objects that have a weight below a threshold. The remaining objects which have a weight above the threshold remain as feature maps. In this way, the feature maps include objects which are relatively more relevant to the concepts 510, 510a, 510n and do not include objects which are relatively less relevant. In embodiments, a user can input the value of the threshold, for example.

In embodiments, the CNN 500 further includes a subsampling layer 540 which receives the feature maps from the convolutional layer 530 and further filters relatively less relevant objects for the concepts 510, 510a, 510n. In embodiments, the subsampling layer 540 filters objects by down-sampling. In embodiments, down-sampling includes pooling weights of objects within the feature maps together to determine which feature maps are less relevant. As an example, a feature map having objects with respect to soccer fans for a soccer game concept is given a weight lower than a feature map of a soccer player for the same soccer game concept, since the objects of the soccer fans are less relevant and therefore given less weight, which results in a relatively less weight for the feature map having objects with respect to soccer fans. Feature maps over the threshold remain as an output from the subsampling layer 540. In embodiments, a user inputs the value of the weights for the down-sampling, amongst other examples. In further embodiments, a user inputs the value for the threshold.

In embodiments, the CNN 500 includes an additional convolutional layer 530a and an additional subsampling layer 540a for further filtering of relevant objects. In embodiments, the neural nodes of the convolutional layer 530a receive the output of the subsampling layer 540 and apply a centrality value to the objects within the output of the subsampling layer 540 in view of the knowledge graph to determine a weight for each object. The neural nodes of the convolutional layer 530a filter out the objects that have a weight below a threshold, while the remaining objects remain as feature maps for the subsampling layer 540a. In embodiments, the subsampling layer 540a receives the feature maps from the convolutional layer 530a and reduces the amount of feature maps by down-sampling for further filtering of objects.

In embodiments, the output of the subsampling layer 540a serves as an input for a fully connected layer 550 of the CNN 500. In embodiments, the fully connected layer 550 takes the output from all the neural nodes of the subsampling layer 540a and arranges the output as a k-dimensional vector 560. In embodiments, the k-dimensional vector 560 is a vector of all the relevant objects to the concepts 510, 510a, 510n, where "k" represents the number of objects in the vector that a GAN chooses from in generating new images. In this way, the CNN 500 encodes objects as a k-dimensional vector 560 for use by a GAN to generate new images. In further embodiments, the CNN 500 includes any number of convolutional layer 530 and subsampling layer 540 pairs prior to the fully connected layer 550 for further filtering of objects relevant to the concepts 510, 510a, 510n.

Figure 6:
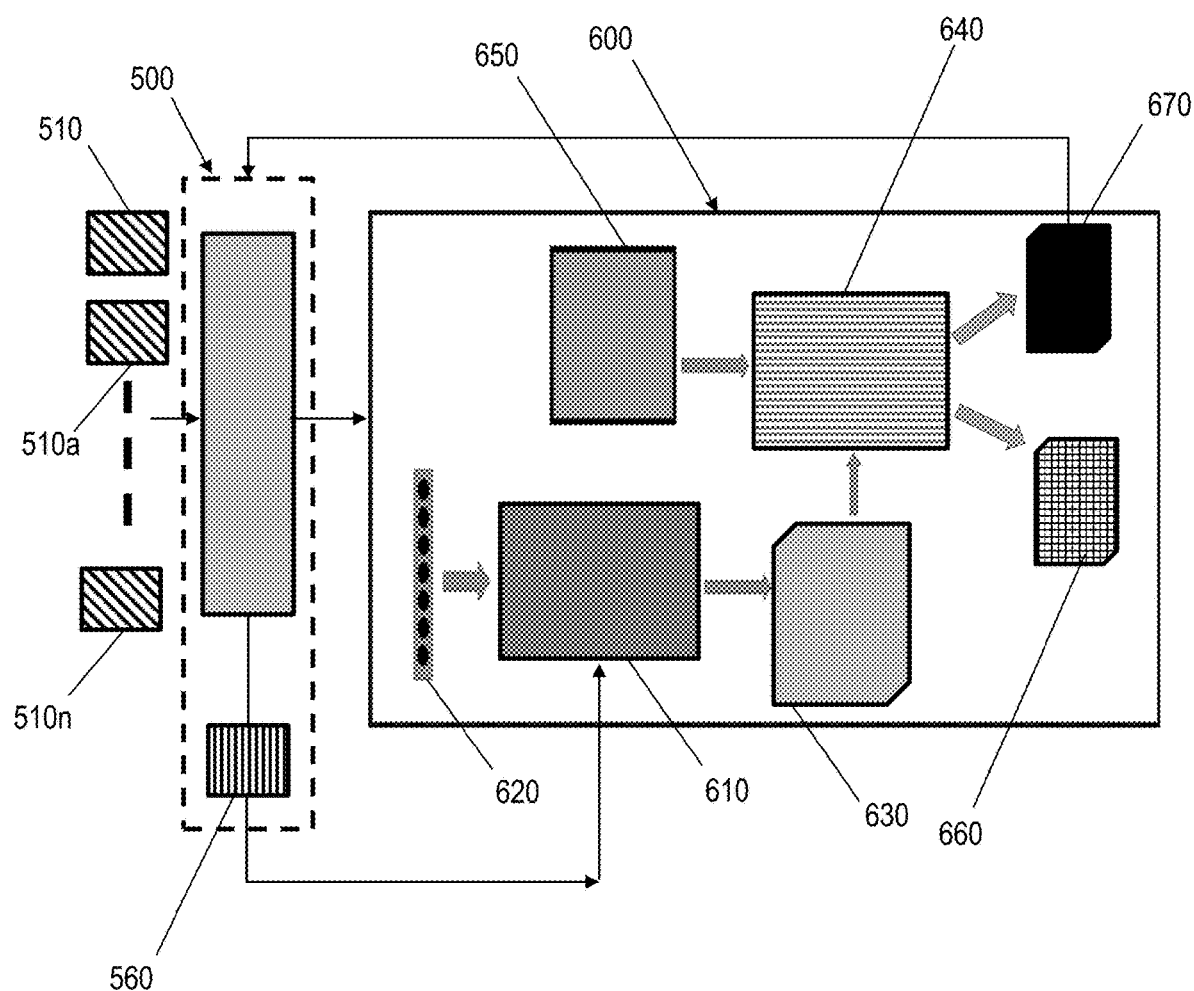
FIG. 6 shows a block diagram of an exemplary generative adversarial network (GAN) in accordance with aspects of the invention.

FIG. 6 illustrates a GAN 600 in accordance with aspects of the invention. In embodiments, the image generation module 430 of FIG. 4 utilizes the GAN 600 and is described with reference to elements depicted in FIGS. 4 and 5.

In embodiments, the image generation module 430 trains the GAN 600 using generative adversarial techniques. In embodiments, the generative adversarial techniques include training a generator 610 of the GAN 600 to learn how to distribute, i.e., stitch, the objects together from the k-dimensional vector 560. By learning this distribution, the generator 610 is able to stitch the objects within the k-dimensional vector 560 to generate a new image 630.

In embodiments, the training of the generator 610 includes receiving a noise vector 620 as an input. In embodiments, the noise vector 620 includes distribution maps representing accurate images. Specifically, the distribution maps illustrate the distribution of objects relevant to the concepts 510, 510a, 510n for a particular domain so that the generator learns the distribution of objects. As an example, the distribution maps are for the concepts 510, 510a, 510n of a soccer player scoring a goal, and include the objects of a soccer player, a soccer ball, a soccer field, etc., with each distribution map representing a different stage of the soccer player kicking the soccer ball. In this way, the generator 610 is able to learn action prediction by learning the distribution of objects through a progression of different distribution maps.

In embodiments, the generator 610 of the GAN 600 receives the k-dimensional vector 560 as an input from the CNN 500. In embodiments, the generator 610 stitches the objects from the k-dimensional vector 560 together in view of training with the distribution maps from the noise vector 620.

In embodiments, image stitching includes taking a plurality of objects and overlapping these objects so that a field of view of each object overlaps with one another to generate a larger image with a wider field of view wider than the field of view of each object. In this way, image stitching includes overlapping fields of view to create a larger image with a wider field of view. As an example, the generator 610 generates a new image 630 by taking the objects from the k-dimensional vector 560, e.g., a soccer field, a soccer ball, a soccer player, a soccer goal, a soccer goalie, etc., and stitching them together in a specific distribution so that a new image 630 illustrates a soccer player in front of a soccer ball and a soccer goalie between the soccer ball and the soccer goal. More specifically, the generator 610 overlaps the field of view of the soccer field over the field of views of the other remaining objects so that there is a generation of a larger image, i.e., new image 630, with a wider field of view. In this example, the new image 630 includes the concepts 510, 510a, 510n, of a soccer game, a soccer player, a soccer goal, etc. In this way, the generator 610 generates the new image 630 by stitching objects from the k-dimensional vector 560 together.

In embodiments, the GAN 600 further includes a discriminator 640 for filtering an accurate new image 660 from an inaccurate new image 670. In embodiments, the image generation module 430 trains the discriminator 640 in view of accurate images 650 and a knowledge base (e.g., a commonsense knowledge base) from the database 440. In even further embodiments, the accurate images 650 and the knowledge base are input by an expert at the input device 460, in addition to the accurate images 650 and the knowledge base being from the database 440.

In embodiments, the discriminator 640 receives the accurate images 650 and generates a scene graph for each image of the accurate images 650. In embodiments, the scene graph captures semantic concepts and objects from the visuals within the accurate images 650. In further embodiments, the scene graph is a plurality of nodes in a tree arrangement, amongst other examples of arrangements, with each node representing a concept from the accurate images 650 as a specific label. For example, the accurate images 650 illustrate a progression of a tennis player hitting a tennis ball. The scene graph generates as a node each concept shown in the accurate images 650, e.g., a node for a tennis player, a node for a tennis racket, a node for a tennis ball, etc. The concept of a tennis player is given a label of "tennis player," while the concept of a tennis racket is given the label "tennis racket."

In embodiments, the scene graph further extracts objects from the visuals of the accurate images 650 and connects the objects to the relevant nodes, i.e., concepts. In view of the scene graph, the discriminator 640 learns which objects correspond to which labels and which objects should be present for each specific label.

In embodiments, the aspects of the invention further train the discriminator 640 by applying the knowledge base to the scene graphs for accuracy verification. In embodiments, the knowledge base includes a plurality of domains, concepts, objects, and corresponding accurate relationships with respect to one another, along with accurate labels for the domains, concepts, and objects. As an example, the knowledge base includes the concepts of a soccer player, kicking a soccer ball, and scoring a goal. In this example, the knowledge base includes labels for a "soccer player," a "soccer ball," etc. In further embodiments, the knowledge base also includes further labels for the objects, e.g., "indoor soccer ball," "outdoor soccer ball," etc. In this way, the knowledge base represents domains, concepts, objects, and their accurate relationships and accurate labels.

In embodiments, for every relationship in the scene graph, the GAN 600 checks the relationship with the knowledge base. For example, the knowledge base includes the labels "soccer player," and "soccer ball," for the concepts and labels for the objects "indoor soccer ball," "outdoor soccer ball," etc. In response to determining that the concepts and objects and their corresponding labels from the scene graphs match the accurate concepts and objects and their corresponding accurate labels from the knowledge base, the GAN 600 determines the scene graph is an accurate scene graph and maintains the accurate scene graph maintains as a reference for filtering images.

In embodiments, the discriminator 640 receives the new image 630 from the generator 610. In this way, a generator 610 of the GAN 600 generates the new image 630, while a discriminator 640 of the GAN 600 receives the new image 630 and determines whether the new image is accurate or inaccurate. In response to receiving the new image 630, the discriminator 640 applies the scene graphs from the accurate images 650 to the new image 630 to determine if the new image 630 is an accurate new image 660.

In embodiments, the discriminator 640 determines if the concepts and objects within the new image 630 match existing scene graphs. In response to the concepts and objects within the new image 630 matching a scene graph, the discriminator 640 determines the new image 630 is an accurate new image 660. In embodiments, the GAN 600 labels the accurate new image 660 as a "real image."

In embodiments, the label of a "real image" indicates that the accurate new image 660 includes an accurate illustration of the relationships between concepts and their relevant objects, along with their accurate relationships and accurate labels. In embodiments, artificial intelligence systems, e.g., deep learning systems, use a "real image" for training, amongst other uses. In this way, aspects of the invention address the difficulties of obtaining image data having labels for training of artificial intelligence systems by generating the accurate new image 660.

In embodiments, the accurate new image 660 enriches existing images by adding relevant objects missing from the existing images that are relevant to the concepts within the existing images. Aspects of the invention achieve this by receiving the concepts 510, 510a, 510n from the existing images, determining relevant objects for these concepts 510, 510a, 510n, filtering these relevant objects down to a k-dimensional vector 560, and stitching the objects from the k-dimensional vector 560 together to generate a new image 630 from the existing image which passes through a discriminator 640 to ensure accuracy.

In embodiments, in response to the concepts and objects within the new image 630 not matching a scene graph, the discriminator 640 determines the new image 630 is an inaccurate new image 670. In further embodiments, in response to determining the new image 630 is an inaccurate new image 670, aspects of the invention propagate the loss, i.e., inaccurate new image 670, back to the CNN 500 for further refining of determining which objects should be in the new image. In embodiments, further refining includes adding the inaccurate new image 670 to the domain knowledge.

Figure 7:
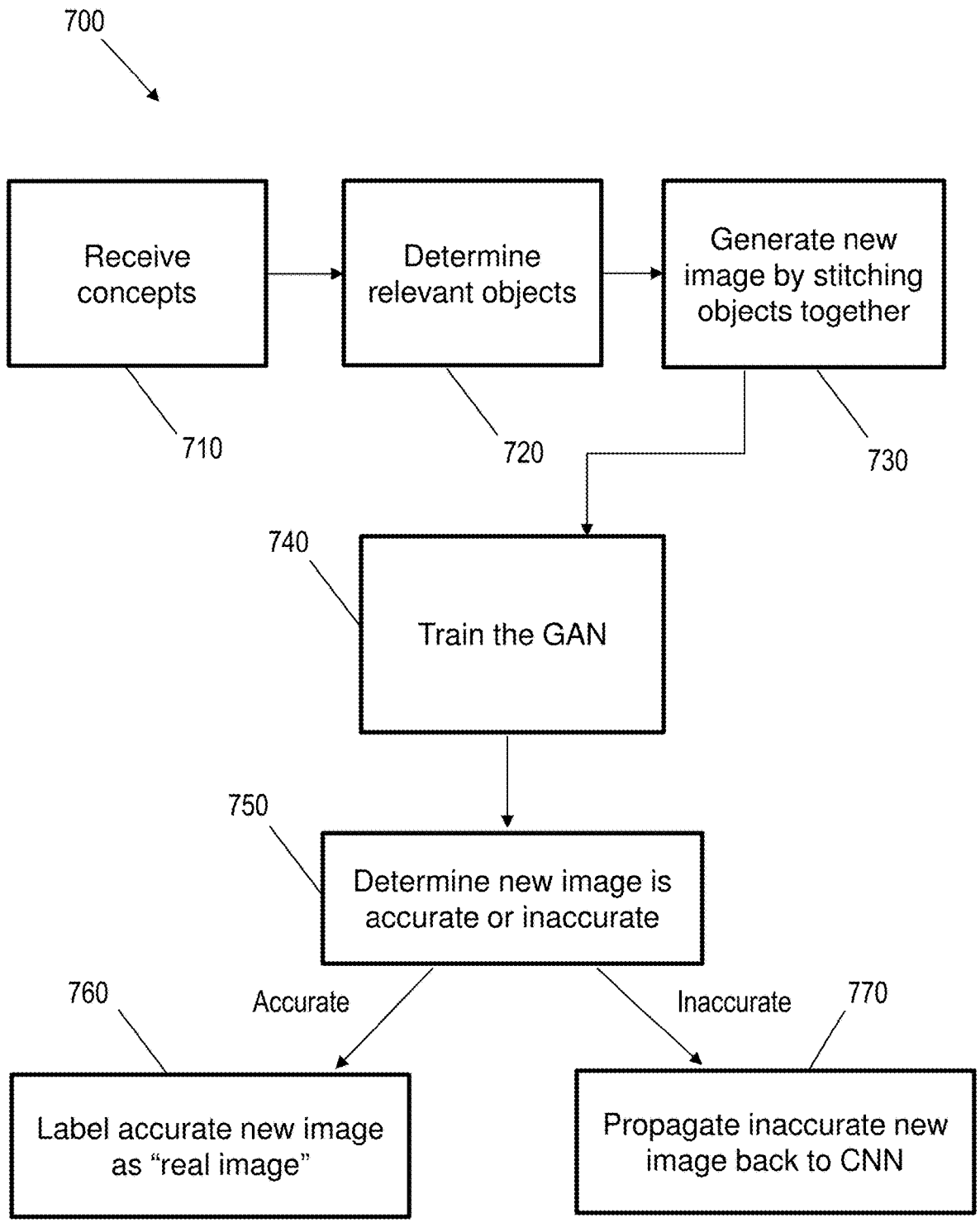
FIG. 7 shows a flowchart of an exemplary workflow in accordance with aspects of the invention.

FIG. 7 shows a flowchart of an exemplary method in accordance with aspects of the present invention. Steps of the method may be carried out in the environment of FIG. 4 and are described with reference to elements depicted in FIGS. 4-6.

At step 710, the CNN 500 receives concepts 510, 510a, 510n relevant to a domain. In embodiments, and as described with respect to FIGS. 4-6, the CNN 500 receives the concepts 510, 510a, 510n as a list of concepts input by an expert through the input device 460 of the computing device 450. In further embodiments, the CNN 500 automatically receives the concepts 510, 510a, 510n by performing object detection using computer vision techniques in addition to or instead of a list of concepts input by an expert.

At step 720, the CNN 500 determines relevant objects relevant to the concepts 510, 510a, 510n. In embodiments, and as described with respect to FIGS. 4-6, the CNN 500 determines the objects by using a concatenation layer 520, a convolutional layer 530, a subsampling layer 540, and a fully connected layer 550. In embodiments, the concatenation layer 520 links the concepts 510, 510a, 510n together with objects relevant to the concepts 510, 510a, 510n by using domain knowledge. In further embodiments, the convolutional layer 530 filters out relatively less relevant objects using a centrality value. In even further embodiments, the subsampling layer 540 further filters relatively less relevant objects for the concepts 510, 510a, 510n by down-sampling. In further embodiments, the fully connected layer 550 takes the output from the subsampling layer 540a and arranges the output as a k-dimensional vector 560.

At step 730, the GAN 600 generates a new image 630. In embodiments, and as described with respect to FIGS. 4-6, the generator 610 generates the new image 630 by stitching the objects from the k-dimensional vector 560 together by overlapping these objects so that a field of view of each object overlaps with one another to generate a larger image with a wider field of view, i.e., new image 630.

At step 740, aspects of the invention train the GAN 600 in generative adversarial techniques. In embodiments, and as described with respect to FIGS. 4-6, aspects of the invention train a generator of the GAN 600 using distribution maps from accurate images. In further embodiments, aspects of the invention train a discriminator 640 by generating scene graphs from accurate images 650 and verifying the accuracy of the scene graphs using the knowledge base.

At step 750, the GAN 600 determines whether the new image 630 is accurate or inaccurate. In embodiments, and as described with respect to FIGS. 4-6, the discriminator 640 applies the scene graphs to the new image 630 to determine if the new image 630 is an accurate new image 660 or an inaccurate new image 670. In response to the concepts and objects within the new image 630 matching a scene graph, the discriminator 640 determines the new image 630 is an accurate new image 660. Alternatively, in response to the concepts and objects within the new image 630 not matching a scene graph, the discriminator 640 determines the new image 630 is an inaccurate new image 670.

At step 760, aspects of the invention label the accurate new image 660. In embodiments, and as described with respect to FIGS. 4-6, the GAN 600 labels the accurate new image 660 as a "real image."

At step 770, aspects of the invention propagate the inaccurate new image 670 back to the CNN 500. In embodiments, and as described with respect to FIGS. 4-6, the GAN 600 propagate the inaccurate new image 670 back to the CNN 500 for adding the inaccurate new image 670 to the domain knowledge.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, a user input comprising concepts of a domain;
determining, by the computing device, objects relevant to the concepts, wherein the relevant objects are not included in the user input;
generating, by the computing device, a new image by stitching the relevant objects together;
generating, by the computing device using a generative adversarial network (GAN), scene graphs to connect the relevant objects to the concepts of the domain;
determining, by the computing device, whether the new image is accurate or inaccurate using the scene graphs generated by the GAN; and
in response to determining the new image is inaccurate, propagating, by the computing device, the inaccurate new image back to a convolutional neural network (CNN).

2. The method of claim 1, further comprising, in response to determining the new image is accurate, labeling, by the computing device, the accurate new image as a real image, wherein the labeling comprises a descriptor for the concepts of the domain, the domain, and the relevant objects related to the accurate new image; and
storing the label in a knowledge base.

3. The method of claim 1, wherein the determining the relevant objects include using a concatenation layer of the CNN.

4. The method of claim 3, wherein the concatenation layer links the concepts together with the relevant objects using domain knowledge.

5. The method of claim 1, wherein the stitching the objects together includes overlapping the relevant objects so that a field of view of each relevant object overlaps to generate an image with a wider field of view wider than the field of view of each object.

6. The method of claim 1, further comprising receiving the new image at the GAN and determining whether the new image is accurate or inaccurate.

7. The method of claim 6, wherein the GAN includes a generator and a discriminator.

8. The method of claim 7, wherein the determining the new image is accurate or inaccurate includes training the discriminator using the scene graphs from accurate images.

9. The method of claim 8, further comprising verifying, by the computing device, accuracy of the scene graphs by applying a knowledge base to the scene graphs.

10. The method of claim 1, wherein the new image is an existing image enriched by the relevant objects and wherein the relevant objects are selected based on a link between the relevant objects and the concepts of the domain.

11. The method of claim 1, wherein the computing device includes software provided as a service in a cloud environment.

12. A computer program product comprising one or more computer readable storage media having program instructions collectively stored on the one or more computer readable storage media, the program instructions executable to:
receive a user input comprising concepts of a domain;
determine objects relevant to the concepts, wherein the relevant objects are not included in the user input;
generate a new image by stitching the relevant objects together;
determine whether the new image is accurate or inaccurate; and
in response to determining the new image is accurate, label the new image as an accurate new image.

13. The computer program product of claim 12, wherein a convolutional neural network (CNN) receives the concepts and wherein the relevant objects are selected from a plurality of sources.

14. The computer program product of claim 13, wherein CNN includes a convolutional layer and the program instructions are executable to filter out less relevant objects with respect to the concepts using a centrality value within the convolutional layer.

15. The computer program product of claim 12, wherein the program instructions are executable to automatically receive the concepts using computer vision.

16. A system comprising:
a processor, a computer readable memory, one or more computer readable storage media, and program instructions collectively stored on the one or more computer readable storage media, the program instructions executable to:
receive a user input comprising concepts of a domain;
determine objects relevant to the concepts, wherein the relevant objects are not included in the user input;
generate a new image by stitching the relevant objects together;
apply scene graphs to the new image; and
in response to determining the new image does not match the scene graphs, propagate the new image back to a convolutional neural network (CNN).

17. The system of claim 16, wherein the CNN includes a subsampling layer which filters out less relevant objects with respect to the concepts.

18. The system of claim 17, wherein the subsampling layer filters out less relevant objects by down-sampling.

19. The system of claim 18, wherein the program instructions are further executable to arrange an output of the subsampling layer as a vector.

20. The computer program product of claim 14, wherein the filtering out less relevant objects comprises down-sampling feature maps of the convolutional later by pooling weights of objects within the feature maps.

* * * * *